R. DOTY.
Metallic Packing.
No. 222,388. Patented Dec. 9, 1879.
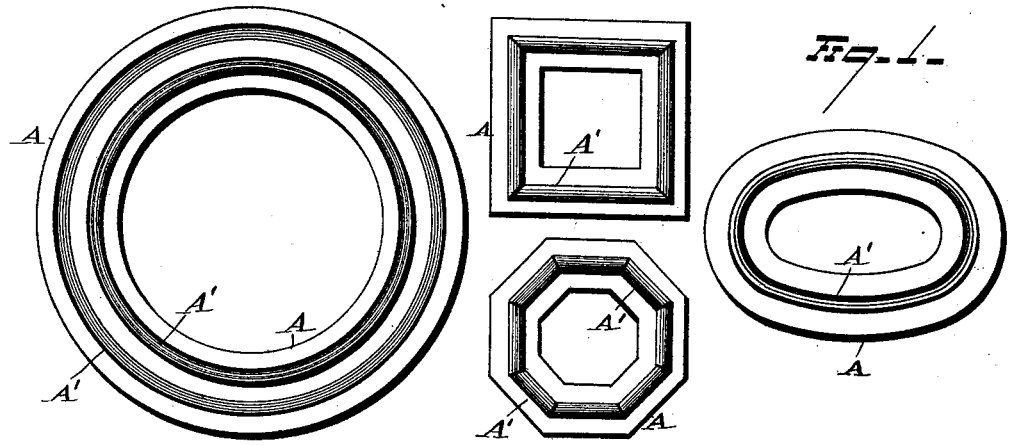
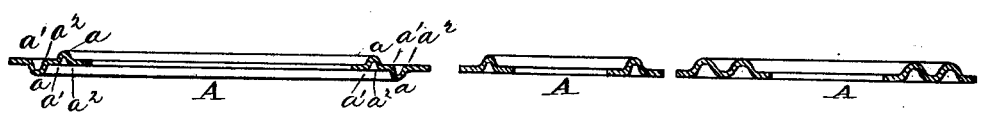
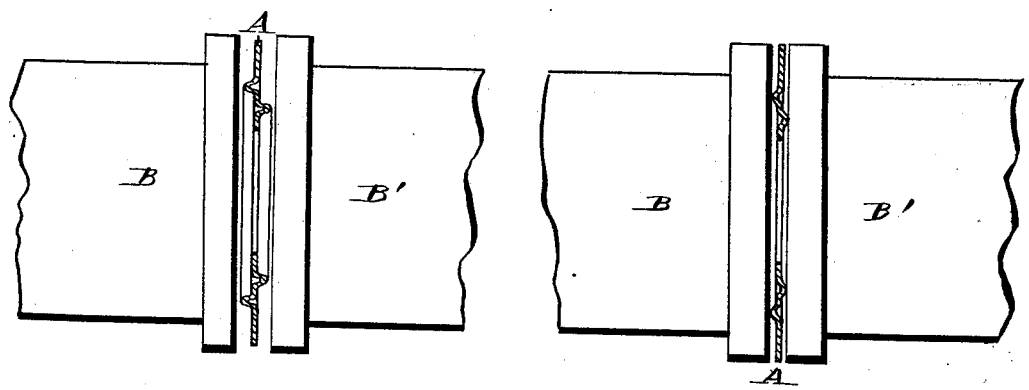
WITNESSES
E. J. Nottingham
A. W. Bright
INVENTOR
R. Doty,
By Leggett and Leggett.
ATTORNEYS.

UNITED STATES PATENT OFFICE.

RHODOLPHUS DOTY, OF CLEVELAND, OHIO.

IMPROVEMENT IN METALLIC PACKING.

Specification forming part of Letters Patent No. 222,388, dated December 9, 1879; application filed June 26, 1879.

*To all whom it may concern:*

Be it known that I, RHODOLPHUS DOTY, of Cleveland, in the county of Cuyahoga and State of Ohio, have invented certain new and useful Improvements in Metallic Packing; and I do hereby declare the following to be a full, clear, and exact description of the invention, such as will enable others skilled in the art to which it pertains to make and use it, reference being had to the accompanying drawings, which form part of this specification.

My invention relates to metal packing for use in pipe-joints, cylinder-heads, &c.; and it consists of sheet metal cut to the desired shape to fit the size and style of the cross-section of the joint to which it is to be adapted, and, when thus shaped, to be corrugated in the direction of its circumference or periphery.

In the drawings, Figure 1 represents, in plan view, a few of an indefinite variety of styles of metal packing constructed according to my invention. Fig. 2 represents, in cross-section, a few of many styles of corrugating said packing. Fig. 3 shows said packing as placed in a pipe-joint prior to said joint being closed. Fig. 4 represents the same with said joint nearly closed, illustrating the operation of my packing.

In the said drawings, A is the packing; B B', the abutting ends of two pipe-sections, or, as the case might be, a steam-cylinder and its head, a steam-chest and its cap, or the like. The packing A is constructed of metal, preferably of copper, zinc, or some non-corrosive non-oxidizable material. This packing is shaped annularly, square, octagonal, oval, or otherwise, to suit the fashion of the joint to be packed. The packing A is formed from sheet metal, and is provided with one, two, or more corrugations, A', in the line of its circumference, substantially as shown in the drawings.

It will be observed that, when placed between the abutting ends of two pipe-sections, or the like, as shown in Figs. 3 and 4, there will be afforded three points of bearing for each corrugation. These points are represented in the drawings at $a\ a'\ a^2$.

Now, when the joints are screwed together, with the packing between them, as shown in Figs. 3 and 4, the corrugated sheet A will not only yield in such a manner as to allow of a proper opposition of said sections, but a tight joint will be secured, which will most effectually prevent any escape of steam, water, or gas under any pressure.

In the use of this packing it is unnecessary to employ anything additional—such as red lead, or the like—to secure perfect tightness. Not only is this advantage obtained; but the packing is practically indestructible when made from copper, zinc, or equivalent non-corrosive substance. It moreover possesses the advantages of great cheapness, of quick use, and certain application, and of permitting a ready opening of the joint should this be required.

What I claim is—

The combination, with the meeting-surfaces in a joint, of a corrugated metallic packing interposed flatwise between the same, whereby said corrugations may be compressed by said meeting-surfaces, substantially as set forth.

In testimony whereof I have signed my name to this specification in the presence of two subscribing witnesses.

RHODOLPHUS DOTY.

Witnesses:
JNO. CROWELL, Jr.,
WILLARD FRACKER.